United States Patent
Shiu et al.

(10) Patent No.: US 9,278,860 B2
(45) Date of Patent: Mar. 8, 2016

(54) METHOD AND APPARATUS FOR RECYCLING WASTE SULFURIC ACID

(71) Applicant: Taiwan Semiconductor Manufacturing Co., Ltd, Hsin-Chu (TW)

(72) Inventors: Jin-Feng Shiu, Hsinchu (TW); Rouh-Jier Wang, Hsinchu (TW); Ching-Jung Hsu, Hsinchu (TW); Wan-Yu Chen, Zhudong Township (TW); Han-Ru Hung, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/338,056

(22) Filed: Jul. 22, 2014

(65) Prior Publication Data
US 2016/0023901 A1  Jan. 28, 2016

(51) Int. Cl.
*C01B 17/69* (2006.01)
*C01B 17/90* (2006.01)
*B01J 14/00* (2006.01)
*B01J 19/00* (2006.01)
*B01J 19/24* (2006.01)

(52) U.S. Cl.
CPC .............. *C01B 17/90* (2013.01); *B01J 19/24* (2013.01); *B01J 2219/00051* (2013.01); *B01J 2219/24* (2013.01)

(58) Field of Classification Search
CPC .......... C01B 17/69; C01B 17/90; B01J 14/00; B01J 19/00

USPC .......................................................... 423/531
See application file for complete search history.

(56) References Cited

U.S. PATENT DOCUMENTS

| | | | | |
|---|---|---|---|---|
| 3,856,673 A | * | 12/1974 | De La Mater et al. | 210/750 |
| 3,875,287 A | * | 4/1975 | Kurikami | 423/101 |
| 4,678,635 A | * | 7/1987 | Jahnke | 420/449 |
| 5,026,535 A | * | 6/1991 | Jonsson et al. | 423/525 |
| 5,489,423 A | * | 2/1996 | Mikami et al. | 423/531 |
| 2002/0192144 A1 | * | 12/2002 | Hostalek et al. | 423/522 |

FOREIGN PATENT DOCUMENTS

| | | | | |
|---|---|---|---|---|
| CN | 1223971 A | | 7/1999 | |
| GB | 2331747 A | * | 6/1999 | ............. C01B 17/90 |
| KR | 100260296 B1 | * | 7/2000 | ............. C01B 17/90 |
| TW | I230684 | | 4/2005 | |

\* cited by examiner

*Primary Examiner* — Timothy Vanoy
(74) *Attorney, Agent, or Firm* — Birch, Stewart, Kolasch & Birch, LLP

(57) ABSTRACT

A method and an apparatus for recycling waste sulfuric acid solution are provided. The method includes providing a reaction tank and introducing a waste sulfuric acid ($H_2SO_4$) solution into the reaction tank, and the waste sulfuric acid solution includes hydrogen peroxide ($H_2O_2$). The method also includes supplying a compound containing chlorine into the reaction tank. The method further includes mixing the compound containing chlorine with the waste sulfuric acid solution to promote a chemical reaction that decomposes the hydrogen peroxide ($H_2O_2$).

19 Claims, 5 Drawing Sheets

METHOD AND APPARATUS FOR RECYCLING WASTE SULFURIC ACID

BACKGROUND

Semiconductor devices are used in a variety of electronic applications, such as personal computers, cell phones, digital cameras, and other electronic equipment. Semiconductor devices are typically fabricated by sequentially depositing insulating or dielectric layers, conductive layers, and semiconductive layers of material over a semiconductor substrate, and patterning the various material layers using lithography to form circuit components and elements thereon.

Sulfuric acid ($H_2SO_4$) is utilized in large quantity in various kinds of industries with a grade (at a purity or a concentration) determined according to the purposes of the industries. In the case that such sulfuric acids are spent, various methods for recycling the sulfuric acids have been proposed.

Although existing recycling methods have been generally adequate for their intended purpose, they have not been entirely satisfactory in all aspects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
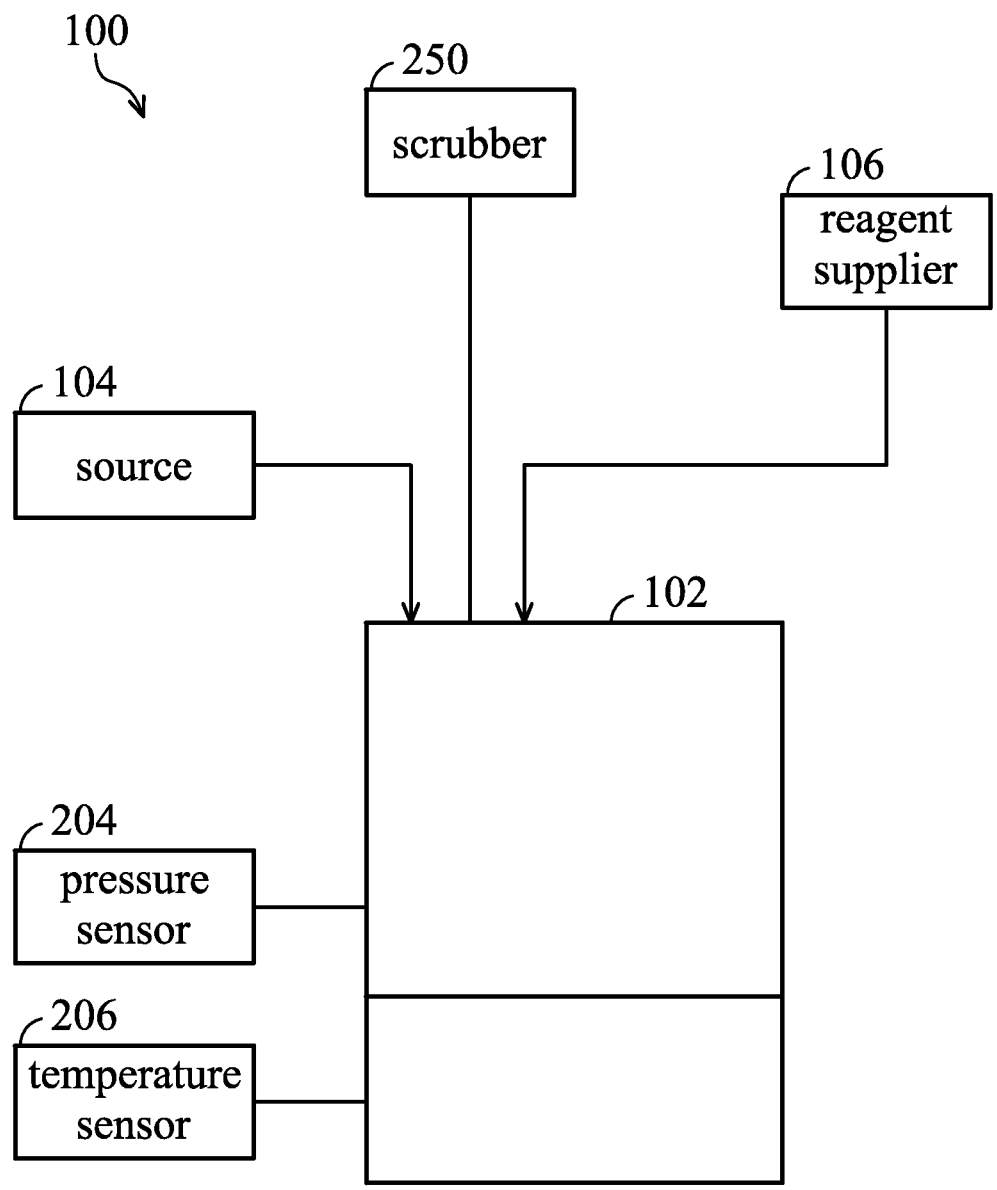
FIG. 1 shows a simplified schematic representation of an apparatus for recycling waste sulfuric acid solution.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some variations of the embodiments are described. Throughout the various views and illustrative embodiments, like reference numbers are used to designate like elements. It is understood that additional operations can be provided before, during, and after the method, and some of the operations described can be replaced or eliminated for other embodiments of the method.

Embodiments of an apparatus and method for recycling waste sulfuric acid solution are provided. FIG. 1 shows a simplified schematic representation of an apparatus 100 for recycling waste sulfuric acid solution.

Apparatus 100 includes a reaction tank 102, a source 104, and a reagent supplier 106. A chemical reaction is performed in reaction tank 102. A source 104 is coupled to reaction tank 102, and it is configured to introduce the waste sulfuric acid ($H_2SO_4$) solution into reaction tank 102. The waste sulfuric acid ($H_2SO_4$) solution includes hydrogen peroxide ($H_2O_2$).

In some embodiments, a wafer is cleaned by a solution containing sulfuric acid ($H_2SO_4$) and hydrogen peroxide ($H_2O_2$), and therefore the waste sulfuric acid ($H_2SO_4$) solution includes hydrogen peroxide ($H_2O_2$). For example, a SPM cleaning process is often used in semiconductor manufacturing factories, which includes performing a solution containing sulfuric acid ($H_2SO_4$) and $H_2O_2$ on a wafer to clean metal ions on the wafer surface. However, after the cleaning process, the waste sulfuric acid ($H_2SO_4$) solution is difficult to be reused because some hydrogen peroxide ($H_2O_2$) (e.g., 3~5 wt %) is remained in the solution, even if the amount of metal ions contained in the waste sulfuric acid solution is small enough to be neglected. Therefore, a method and an apparatus for removing hydrogen peroxide ($H_2O_2$) are provided.

A reagent supplier 106 is coupled to reaction tank 102, and it is configured to supply a compound containing chlorine (Cl). The compound containing chlorine includes chlorine gas ($Cl_2$) or a solution containing chloride ions ($Cl^-$). The solution containing chloride ions ($Cl^-$) includes hydrogen chloride (HCl) solution, hypochlorous acid (HOCl) solution, sodium hypochlorite, (NaOCl) solution or sodium chloride (NaCl) solution.

In reaction tank 102, the waste sulfuric acid solution and the compound containing chlorine are mixed to form a mixed solution, and chemical reactions are performed in the mixed solution. The chemical reactions can reduce the concentration of the hydrogen peroxide ($H_2O_2$) in the mixed solution.

In some embodiments, the solution containing hydrogen chloride (HCl) solution is supplied into reaction tank 102, and the chemical reactions are performed by reacting waste sulfuric acid ($H_2SO_4$) solution and the hydrogen chloride (HCl) solution. The chemical reactions are shown by chemical equation (I) and chemical equation (II). Chemical equation (III) represents the total reaction of chemical equation (I) and chemical equation (II).

$$H_2O_2 + 2HCl \rightarrow Cl_{2(g)} + 2H_2O \quad \text{(I)}$$

$$H_2O_2 + Cl_2 \rightarrow O_{2(g)} + 2HCl \quad \text{(II)}$$

$$2H_2O_2 \rightarrow O_{2(g)} + 2H_2O \quad \text{(III)}$$

As shown in chemical equation (I), the hydrogen peroxide ($H_2O_2$) is decomposed by HCl with the production of chlorine gas ($Cl_2$) and water. As shown in chemical equation (II), chlorine gas ($Cl_2$), reacts with hydrogen peroxide ($H_2O_2$), and oxygen gas ($O_2$) and hydrogen chloride (HCl) are produced. In other words, once chlorine gas ($Cl_2$) is produced from the chemical equation (I), chlorine gas ($Cl_2$) acts as a reagent to further decompose hydrogen peroxide ($H_2O_2$), as shown in chemical equation (II). Therefore, a chain reaction is constructed by chemical equations (I) and (II). In addition, the hydrogen chloride (HCl) is used as a catalyst for promoting the occurrence of the chemical equations (I) and (II). It should be noted that the waste gas produced in the chemical equations (I) and (II), including $Cl_2$ and $O_2$, can be easily removed because they are in a gas form.

It should be noted that the rate equation of the chemical equation (I) is: r (rate)=k[$H^+$][$Cl^-$][$H_2O_2$], and k is the reaction rate coefficient. [$H^+$] represents the concentration of the hydrogen ion. [$Cl^-$] represents the concentration of the chloride ion ($Cl^-$), and [$H_2O_2$] represents the concentration of hydrogen peroxide ($H_2O_2$). The reaction rate is increased as the concentrations of hydrogen ions ($H^+$), chloride ions ($Cl^-$) or/and hydrogen peroxide ($H_2O_2$) are increased. Because the waste sulfuric acid ($H_2SO_4$) solution provides a large amount of hydrogen ions ($H^+$) and the addition of the catalyst (e.g., HCl), the rate of the chemical equation (I) is high, which provides high throughput of the recycling of the waste sulfuric acid. In addition, the chemical equations (I) and (II) are performed spontaneously when the compound containing chlorine are added into the waste sulfuric acid ($H_2SO_4$) solution containing hydrogen peroxide ($H_2O_2$).

In some embodiments, the waste sulfuric acid ($H_2SO_4$) solution has a concentration in a range from about 1% to about 95% of sulfuric acid. If the concentration of waste sulfuric acid ($H_2SO_4$) solution is too low, the reaction may not occur.

In some embodiments, the compound containing chlorine is about 0.001 wt % to about 0.4 wt % of a total weight of the compound containing chlorine and the waste sulfuric acid solution before the occurrence of the chemical reaction. If the concentration of the compound containing chlorine is too low, hydrogen peroxide ($H_2O_2$) may not be removed efficiently even elongate the reaction time. If the concentration of the compound containing chlorine is too high, the cost is increased due to excess of the compound containing chlorine.

The compound containing chlorine and the waste sulfuric acid ($H_2SO_4$) solution are mixed for a period of time in a range from 48 hours to about 4 hours. If the time is too short, hydrogen peroxide ($H_2O_2$) may not be removed efficiently. If the time is too long, the throughout is decreased.

It should be noted that although the chemical equations (I) and (II) are performed spontaneously and are exothermic reactions, the temperature of mixed solution in the reaction tank 102 is not higher than 80° C. There are several methods for recycling waste sulfuric acid solution, such as distillation or UV light catalyst. However, the distillation method is operated under undesirable high temperature and high pressure. The disadvantage of the UV light catalyst method is that a long reaction time is needed and the throughput is low. Compared with distillation at high temperatures (such as those higher than 100° C.)., the method of the disclosure under less than 80° C. is safer. In some embodiments, there is no need of an additional cooling system since the reaction temperature is low.

Referring to FIG. 1 again, a scrubber 250 is coupled to reaction tank 102, and it is configured to remove the waste gas generated from reaction tank 102. In some embodiments, scrubber 250 is a wet scrubber and it uses liquid (such as water) to remove the waste gas. In some embodiments, chlorine gas ($Cl_2$) and oxygen ($O_2$) are produced and transported into scrubber 250 (e.g., evacuated by a vacuum device in the scrubber 250), and are removed by dissolving in water.

A pressure sensor 204 and a temperature sensor 206 are coupled to reaction tank 102. Pressure sensor 204 is configured to monitor the pressure of reaction tank 102. Temperature sensor 206 is configured to monitor the temperature of reaction tank 102. These sensors 204, 206 are used to prevent gas in the reaction tank 102 from leaking due to the high temperature.

Figure 2:
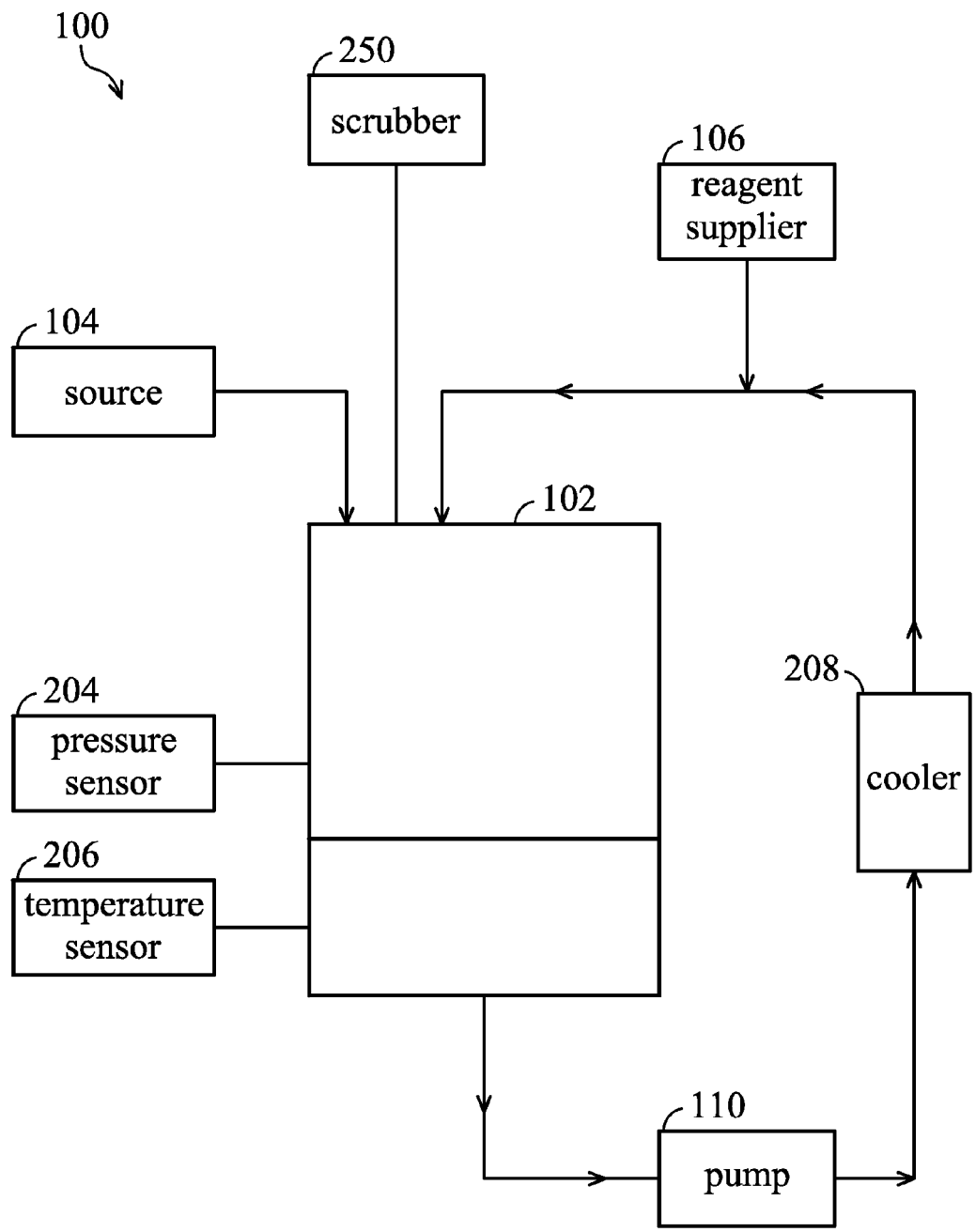
FIG. 2 shows a simplified schematic representation of an apparatus for recycling waste sulfuric acid solution.

FIG. 2 shows a simplified schematic representation of an apparatus 100 for recycling waste sulfuric acid solution. The difference between FIG. 1 and FIG. 2 is that a pump 110 and a cooler 208 are coupled to reaction tank 102 in FIG. 2.

Pump 110 is configured to draw out a portion of mixed solution from reaction tank 102, and afterwards pump a circulating solution into reaction tank 102. The circulating solution is constructed by mixing the portion of mixed solution and the compound containing chlorine. The circulating solution is introduced into reaction tank 102 for supplying sufficient chloride ions ($Cl^-$) to react with $H_2O_2$. The cycle can be repeated until the hydrogen peroxide ($H_2O_2$) is completely removed.

In some embodiments, as shown in FIG. 2, cooler 208 is disposed between pump 110 and reagent supplier 106, and it is configured to cool the temperature of the portion of mixed solution drawn from reaction tank 102.

Figure 3:
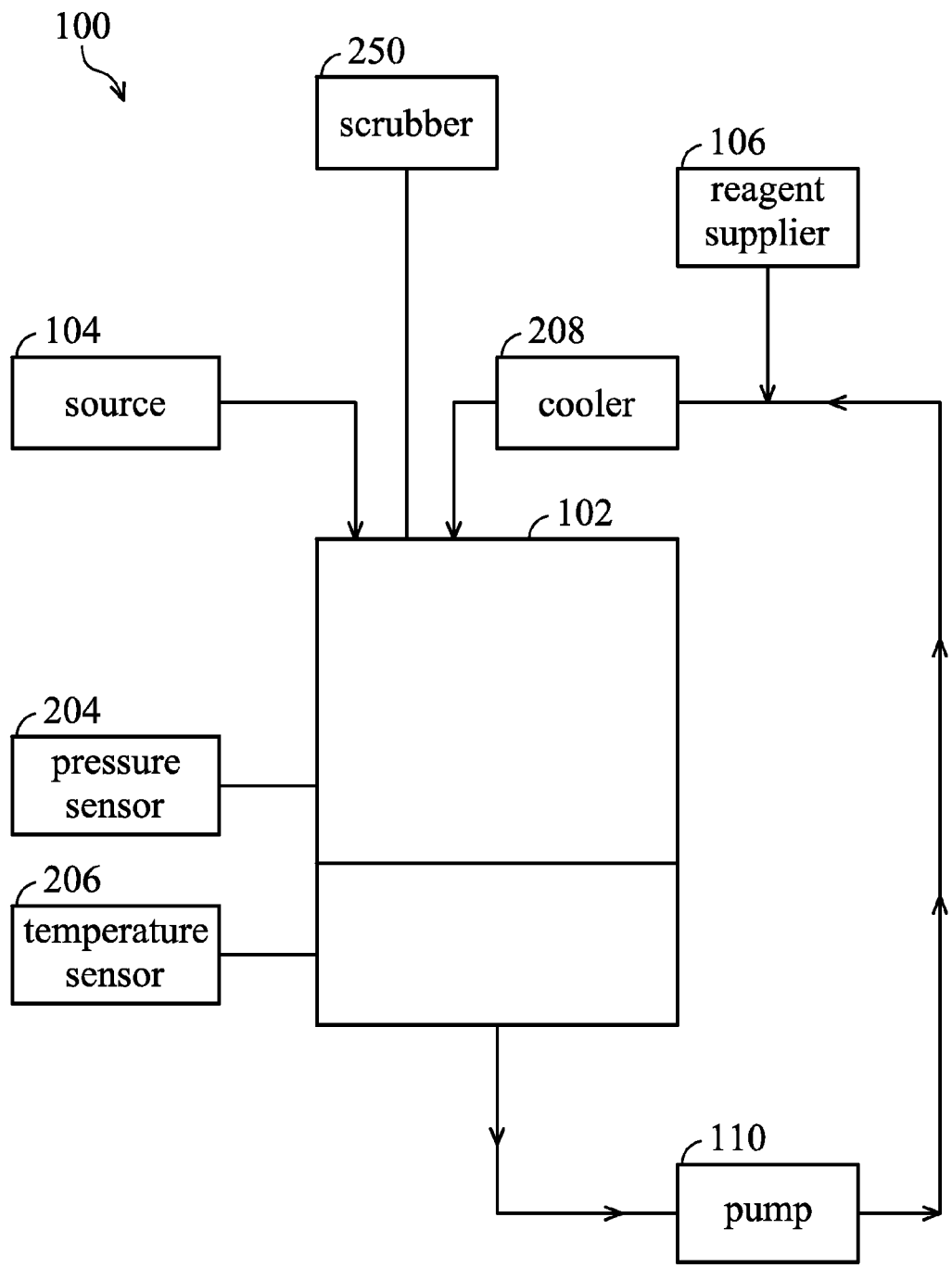
FIG. 3 shows a simplified schematic representation of an apparatus 100 for recycling waste sulfuric acid solution.

FIG. 3 shows a simplified schematic representation of an apparatus 100 for recycling waste sulfuric acid solution. The positions of cooler 208 in FIG. 2 and FIG. 3 are different. In some other embodiments, as shown in FIG. 3, the cooler 208 is disposed between reagent supplier 106 and reaction tank 102, and it is configured to cool the temperature of the circulating solution.

Figure 4:
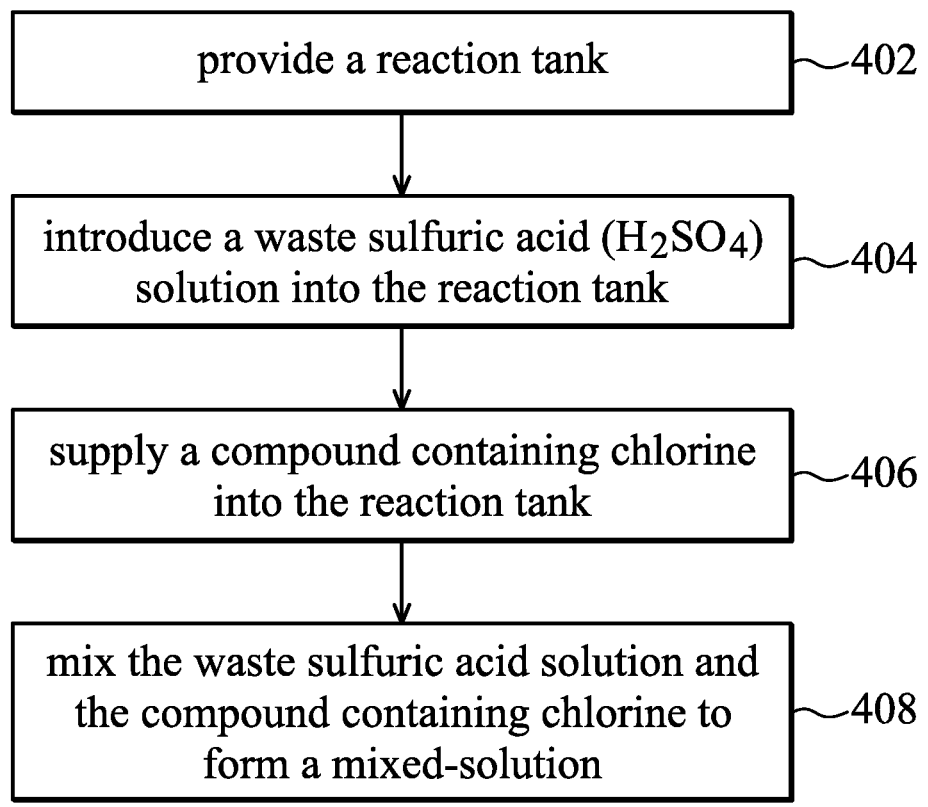
FIG. 4 shows a flow-chart of a method for recycling waste sulfuric acid solution, in accordance with some embodiments.

FIG. 4 shows a flow-chart of a method for recycling waste sulfuric acid solution, in accordance with some embodiments.

In operation 402, the reaction tank, such as reaction tank 102 in FIG. 1, is provided.

In operation 404, the waste sulfuric acid ($H_2SO_4$) solution is introduced into the reaction tank. In some embodiments, as shown in FIG. 1, the waste sulfuric acid ($H_2SO_4$) solution is provided by source 104 and introduced into reaction tank 102. The waste sulfuric acid solution includes hydrogen peroxide ($H_2O_2$).

In operation 406, the compound containing chlorine is supplied into the reaction tank. In some embodiments, as shown in FIG. 1, the compound containing chlorine is provided by reagent supplier 106 and supplied into reaction tank 102.

In operation 408, the waste sulfuric acid solution and the compound containing chlorine are mixed to form a mixed solution. It should be noted that the compound containing chlorine promotes chemical reactions that decompose hydrogen peroxide ($H_2O_2$) in the mixed solution. After operation 408, a concentration of the hydrogen peroxide ($H_2O_2$) is measured to confirm most of the hydrogen peroxide ($H_2O_2$) is removed or completely removed. In some embodiments, the hydrogen peroxide ($H_2O_2$) is measured by a titration method.

In addition, the method for recycling waste sulfuric acid solution further includes collecting the waste gas generated from the reaction tank, transporting the waste gas into the scrubber and measuring the concentration of the waste gas. In some embodiments, chlorine gas ($Cl_2$) is collected and transported into scrubber 250.

Figure 5:
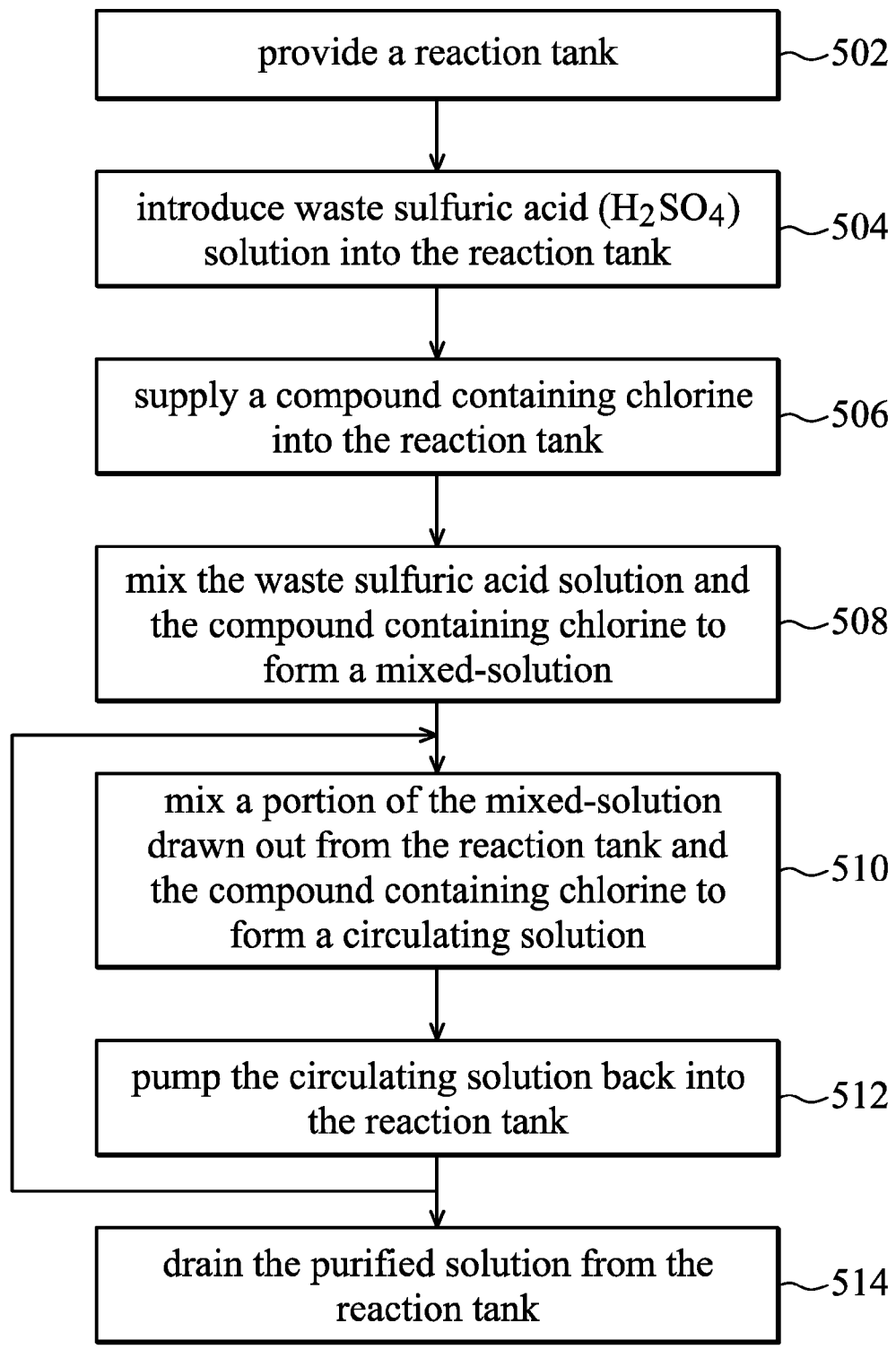
FIG. 5 shows a flow-chart of a method for recycling waste sulfuric acid solution, in accordance with some embodiments.

FIG. 5 shows a flow-chart of a method for recycling waste sulfuric acid solution, in accordance with some embodiments.

In operation 502, the reaction tank, such as reaction tank 102 in FIG. 1, is provided.

In operation 504, the waste sulfuric acid ($H_2SO_4$) solution is introduced into the reaction tank. In some embodiments, as shown in FIG. 1, the waste sulfuric acid ($H_2SO_4$) solution is provided by source 104 and introduced into reaction tank 102. The waste sulfuric acid solution includes hydrogen peroxide ($H_2O_2$).

In operation 506, the compound containing chlorine is supplied into the reaction tank. In some embodiments, as shown in FIG. 1, the compound containing chlorine is provided by reagent supplier 106 and supplied into reaction tank 102.

In operation 508, the waste sulfuric acid solution and the compound containing chlorine are mixed to form a mixed solution. It should be noted that the compound containing chlorine promotes chemical reactions that decomposes hydrogen peroxide ($H_2O_2$) in the mixed solution.

In operation 510, a portion of the mixed solution drawn out from the reaction tank and the compound containing chlorine are mixed to form a circulating solution. In some embodiments, a portion of the mixed solution drawn out from reaction tank 102 by pump 110, and afterwards it and the compound containing chlorine are mixed to form the circulating solution.

Before operation 512, in some embodiments, the mixed solution is cooled through the cooler (such as cooler 208 in FIG. 2). In some other embodiments, the circulating solution is cooled through the cooler (such as cooler 208 in FIG. 3).

In operation 512, the circulating solution is pumped back into the reaction tank. In some embodiments, the circulating solution is pumped back into reaction tank 102 by pump 110.

In operation 514, the purified solution is drained from the reaction tank. In operation 512, the circulation solution is mixed with the mixed solution and forms a purified solution.

Before operation 514, the operations 510 and 512 are repeated to remove hydrogen peroxide ($H_2O_2$) completely. In some embodiments, 0 to 5 wt % or higher concentration of the hydrogen peroxide ($H_2O_2$) in the waste sulfuric acid is removed.

In addition, the method for recycling waste sulfuric acid solution further includes collecting the waste gas generated from the reaction tank, transporting the waste gas into the scrubber and measuring the concentration of the waste gas. In some embodiments, chlorine gas ($Cl_2$) is collected and transported into scrubber 250.

Comparative Embodiment 1

As shown in Table 1, a mixed solution which contains 1 wt % of hydrogen chloride (HCl) and about 4 wt % hydrogen peroxide in water was prepared. The mixed solution was then stirred for 4 hours. Measurements show that the concentration of hydrogen peroxide was decreased from about 4 wt % to 3.7 wt % after the 4 hour stirring. No obvious decomposition of hydrogen peroxide was observed.

Comparative Embodiment 2

As shown Table 2, a mixed solution which contains 60 wt % of sulfuric acid and about 5 wt % hydrogen peroxide in water was prepared. The mixed solution was then stirred for 4 hours. Measurements show that the concentration of the hydrogen peroxide was decreased from 5 wt % to 4.9 wt % after the 4 hour stirring. No obvious decomposition of hydrogen peroxide was observed.

TABLE 1

| Mixed solution originally prepared | | Mixed solution after stirring for 4 hours | | | |
| --- | --- | --- | --- | --- | --- |
| $H_2O_2$ (wt %) | Temperature of the waste acid (° C.) | $H_2O_2$ (wt %) | Temperature of the waste acid (° C.) | Concentration of $Cl^-$ (wt %) | Reaction period (hours) |
| 4.01 | 23 | 3.7 | 23 | 0.99 | 4 |

TABLE 2

| Mixed solution originally prepared | | Mixed solution after stirring for 4 hours | | |
| --- | --- | --- | --- | --- |
| $H_2O_2$ (wt %) | Temperature of the waste acid (° C.) | $H_2O_2$ (wt %) | Temperature of the waste acid (° C.) | Reaction period (hours) |
| 5 | 23 | 4.9 | 23 | 4 |

Embodiments 1-5

As shown in Table 3, mixed solutions which contain 60 wt % of sulfuric acid, about 4 wt % of hydrogen peroxide and different concentrations of hydrogen chloride in water were prepared. The mixed solutions were then stirred for 4 hours. Measurements show that the concentrations of hydrogen peroxide were significantly decreased after mixing hydrogen chloride with sulfuric acid and hydrogen peroxide, which proves the occurrence of chemical reactions as shown in chemical equations (I) and (II). More specifically, in Embodiments 4 and 5, hydrogen peroxide ($H_2O_2$) was totally removed. In addition, after adding HCl into the waste acid, the temperature of the waste acid solution was not higher than 70° C.

TABLE 3

| | Originally prepared mixed | | | Mixed solution after stirring for 4 hours | | | |
| --- | --- | --- | --- | --- | --- | --- | --- |
| Embodiments | HCl (wt %) | $H_2O_2$ (wt %) | Temperature of the waste sulfuric acid solution (° C.) | $H_2O_2$ (wt %) | Temperature of the waste sulfuric acid solution (° C.) | Concentration of $Cl^-$ (ppm) | Reaction period (hours) |
| 1 | 0.248 | 4.01 | 37 | 1 | 61 | 3 | 4 |
| 2 | 0.31 | 4.08 | 36 | 0.6 | 64 | 5 | 4 |
| 3 | 0.331 | 3.92 | 37 | 0.03 | 67 | 5 | 4 |
| 4 | 0.413 | 4.02 | 37 | 0 | 69 | 58 | 4 |
| 5 | 0.496 | 3.95 | 36 | 0 | 70 | 111 | 4 |

Embodiments for recycling waste sulfuric acid solution are provided. A waste sulfuric acid ($H_2SO_4$) solution is introduced into a reaction tank, and afterwards a solution containing chloride ion (Cl⁻) is supplied into a reaction tank. The waste sulfuric acid ($H_2SO_4$) solution includes hydrogen peroxide ($H_2O_2$), and a chemical reaction is performed in the reaction tank by reacting hydrogen peroxide ($H_2O_2$), the sulfuric acid ($H_2SO_4$), and the hydrogen peroxide ($H_2O_2$). After reacting for a period of time, hydrogen peroxide ($H_2O_2$) is reduced and even completely removed. The method for recycling waste sulfuric acid solution is easy to operate and the fabricating cost and time are reduced.

In some embodiments, a method for recycling waste sulfuric acid solution is provided. The method includes providing a reaction tank and introducing a waste sulfuric acid ($H_2SO_4$) solution into the reaction tank, and the waste sulfuric acid solution includes hydrogen peroxide ($H_2O_2$). The method also includes supplying a compound containing chlorine into the reaction tank. The method further includes mixing the compound containing chlorine with the waste sulfuric acid solution to promote a chemical reaction that decomposes the hydrogen peroxide ($H_2O_2$).

In some embodiments, a method for recycling waste sulfuric acid solution is provided. The method includes providing a reaction tank, and introducing waste sulfuric acid ($H_2SO_4$) solution into the reaction tank, and the waste sulfuric acid solution comprises hydrogen peroxide solution ($H_2O_2$). The method also includes supplying a compound containing chlorine into the reaction tank. The method further includes mixing the waste sulfuric acid solution and the compound containing chlorine to form a mixed solution. The method includes mixing a portion of the mixed solution drawn out from the reaction tank and the compound containing chlorine to form a circulating solution. The method further includes pumping the circulating solution back into the reaction tank.

In some embodiments, an apparatus for recycling waste sulfuric acid solution is provided. The apparatus includes a reaction tank. The apparatus also includes a source coupled to the reaction tank, and the source is configured to introduce waste sulfuric acid ($H_2SO_4$) solution into the reaction tank. The apparatus further includes a reagent supplier coupled to the reaction tank, and the reagent supplier is configured to supply a compound containing chlorine into the reaction tank.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for recycling waste sulfuric acid solution, comprising:
    providing a reaction tank;
    introducing a waste sulfuric acid ($H_2SO_4$) solution into the reaction tank, wherein the waste sulfuric acid solution comprises hydrogen peroxide ($H_2O_2$) and;
    supplying a compound containing chlorine into the reaction tank;
    mixing the compound containing chlorine with the waste sulfuric acid solution to promote a chemical reaction that decomposes the hydrogen peroxide ($H_2O_2$); and
    collecting a waste gas generated from the reaction tank after mixing the waste sulfuric acid solution and the compound containing chlorine, wherein the waste gas comprises $Cl_2$ and $O_2$.

2. The method for recycling waste sulfuric acid solution as claimed in claim 1, wherein the compound containing chlorine comprises chlorine gas ($Cl_2$), hydrogen chloride (HCl) solution, hypochlorous acid (HOCl) solution, sodium hypochlorite (NaOCl) solution or sodium chloride (NaCl) solution.

3. The method for recycling waste sulfuric acid solution as claimed in claim 1, wherein mixing the waste sulfuric acid solution and the compound containing chlorine comprises mixing the waste sulfuric acid solution and the compound containing chlorine for a period of time in a range from 48 hours to about 4 hours.

4. The method for recycling waste sulfuric acid solution as claimed in claim 1, wherein a temperature of the waste sulfuric acid solution during the occurrence of the chemical reaction is not higher than 80° C.

5. The method for recycling waste sulfuric acid solution as claimed in claim 1, after collecting the waste gas generating from the reaction tank, further comprising:
    transporting the waste gas into a scrubber.

6. The method for recycling waste sulfuric acid solution as claimed in claim 5, further comprising:
    measuring a concentration of the waste gas.

7. The method for recycling waste sulfuric acid solution as claimed in claim 1, wherein the compound containing chlorine acts as a catalyst in the chemical reaction.

8. The method for recycling waste sulfuric acid solution as claimed in claim 1, wherein the waste sulfuric acid ($H_2SO_4$) solution has a sulfuric acid concentration in a range from about 1 wt % to about 95 wt %.

9. The method for recycling waste sulfuric acid solution as claimed in claim 1, wherein the compound containing chlorine is about 0.001 wt % to about 0.4 wt % of a total weight of the compound containing chlorine and the waste sulfuric acid solution before the occurrence of the chemical reaction.

10. A method for recycling waste sulfuric acid solution, comprising:
    providing a reaction tank;
    introducing a waste sulfuric acid ($H_2SO_4$) solution into the reaction tank, wherein the waste sulfuric acid solution comprises hydrogen peroxide solution ($H_2O_2$);
    supplying a compound containing chlorine into the reaction tank; and
    mixing the compound containing chlorine with the waste sulfuric acid solution to form a mixed solution, wherein the compound containing chlorine promotes a chemical reaction that decomposes the hydrogen peroxide ($H_2O_2$) in the mixed solution;
    mixing a portion of the mixed solution drawn out from the reaction tank and the compound containing chlorine to form a circulating solution; and
    pumping the circulating solution back into the reaction tank.

11. The method for recycling waste sulfuric acid solution as claimed in claim 10, before mixing a portion of the mixed solution drawn out from the reaction tank and the compound containing chlorine to form a circulating solution, further comprising:
    cooling the mixed solution through a cooler.

12. The method for recycling waste sulfuric acid solution as claimed in claim 10, before pumping the circulating solution back into the reaction tank further comprises:
    cooling the circulating solution through a cooler.

13. The method for recycling waste sulfuric acid solution as claimed in claim 10, wherein the compound containing chlorine comprises chlorine gas ($Cl_2$), hydrogen chloride (HCl) solution, hypochlorous acid (HOCl) solution, sodium hypochlorite (NaOCl) solution or sodium chloride (NaCl) solution.

14. The method for recycling waste sulfuric acid solution as claimed in claim 10, further comprising:
repeating the following operations:
mixing a portion of the mixed solution drawn out from the reaction tank and the compound containing chlorine to form the circulating solution; and
pumping the circulating solution back into the reaction tank.

15. The method for recycling waste sulfuric acid solution as claimed in claim 10, after mixing the waste sulfuric acid solution and the compound containing chlorine, further comprising:
collecting a waste gas generating from the reaction tank, wherein the waste gas comprises $Cl_2$ and $O_2$; and
transporting the waste gas into a scrubber.

16. An apparatus for recycling waste sulfuric acid solution, comprising:
a reaction tank;
a source coupled to the reaction tank, wherein the source is configured to introduce waste sulfuric acid ($H_2SO_4$) solution into the reaction tank, wherein the waste sulfuric solution comprises $H_2O_2$;
a reagent supplier coupled to the reaction tank, wherein the reagent supplier is configured to supply a compound containing chlorine into the reaction tank; and
a scrubber coupled to the reaction tank, wherein the scrubber is configured to remove a waste gas generated from the reaction tank.

17. The apparatus for recycling waste sulfuric acid solution as claimed in claim 16, further comprising:
a pump coupled to the reaction tank and the reagent supplier.

18. The apparatus for recycling waste sulfuric acid solution as claimed in claim 16, further comprising:
a pressure sensor coupled to the reaction tank; and
a temperature sensor coupled to the reaction tank.

19. The apparatus for recycling waste sulfuric acid solution as claimed in claim 16, further comprising:
a cooler coupled to the reaction tank.

\* \* \* \* \*